US006322104B1

(12) United States Patent
Duppong et al.

(10) Patent No.: US 6,322,104 B1
(45) Date of Patent: Nov. 27, 2001

(54) EXCAVATOR FRAME AND METHOD OF ASSEMBLY

(75) Inventors: Gerald J. Duppong, Bismarck; Stacey A. Zander, Mandan; Warren M. Schatz; Jay J. Bleth, both of Bismarck, all of ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/490,929

(22) Filed: Jan. 25, 2000

Related U.S. Application Data

(63) Continuation-in-part of application No. 09/260,240, filed on Mar. 2, 1999.

(51) Int. Cl.[7] ............................. B62D 21/00; B66C 23/84
(52) U.S. Cl. .......................... 280/781; 180/311; 212/247; 212/253; 414/687
(58) Field of Search .................................... 280/781, 785; 180/311, 906; 212/253, 247; 414/687; 301/128

(56) References Cited

U.S. PATENT DOCUMENTS

| 4,361,242 | 11/1982 | Dion et al. | 212/253 |
|---|---|---|---|
| 4,391,341 | 7/1983 | Taghon | 212/253 |
| 4,397,481 | 8/1983 | Dion et al. | 280/781 |
| 4,596,508 | 6/1986 | Kishi et al. | 414/687 |
| 4,622,860 | 11/1986 | Cametti et al. | 74/448 |

FOREIGN PATENT DOCUMENTS

| 1 033 448 A3 | 12/2000 | (EP) . |
|---|---|---|
| 2467759 | 4/1981 | (FR) . |
| 05/179675 | 7/1993 | (JP) . |
| 08/004053 | 1/1996 | (JP) . |
| 10/266263 | 10/1998 | (JP) . |
| 11/278300 | 10/1999 | (JP) . |

OTHER PUBLICATIONS

Brochure on the 300 C–Series Excavators by Melroe Company, printed 10/97.

*Primary Examiner*—Paul N. Dickson
(74) *Attorney, Agent, or Firm*—Westman, Champlin & Kelly, P.A.

(57) ABSTRACT

An excavator undercarriage frame is made to reduce the amount of machining necessary for supporting a swing bearing and ring gear on which an upper swing platform including the cab and operator's platform are mounted. The frame is made in two separate frame sections having top plates and formed peripheral skirts that nest together to form a planar support on which the base ring of a swing bearing and ring gear are mounted. The frame section plates are thin enough so that they will flex to conform to the base ring of the swing bearing, so it is not necessary to provide a machined surface for the swing bearing. The frame sections are welded together only around the peripheral edges and skirts, so that the distortion in the plates is substantially eliminated. The plates can be then bolted or secured directly to the bearing base ring, preferably using a clamp ring on the bottom of the frame plates and will provide an adequate support with the two plate thicknesses, and will be true and square without machining.

20 Claims, 6 Drawing Sheets

EXCAVATOR FRAME AND METHOD OF ASSEMBLY

CROSS REFERENCE TO RELATED APPLICATION

This application is a continuation-in-part of U.S. patent application Ser. No. 09/260,240, filed Mar. 2, 1999.

BACKGROUND OF THE INVENTION

The present invention relates to an undercarriage frame structure for an excavator or power shovel that provides proper support for a bearing and ring gear of an excavator upper structure without machining the frame, resulting in reduced manufacturing costs. The frame is used for supporting additional components for mounting the tracks that propel the excavator, and auxiliary equipment such as a backfill blade.

In the prior art, mini excavators or small power shovels are widely used. These are track propelled vehicles that have an undercarriage mounting the track and accessory items, and including a frame with a horizontal surface on which a bearing and ring gear that supports a rotatable turntable plate is mounted. The turntable mounts a cab and operator's platform, as well as the excavator bucket. The existing undercarriage frame that mount the bearing and a ring gear typically is a very thick or heavy plate that has a machined surface on which the bearing support is mounted, in order to obtain a surface that is flat and perpendicular to the vertical axis of rotation. The plate is large and heavy, making it difficult to handle and time consuming to machine, which increases the manufacturing costs. Since the bearing support ring is quite heavy as well, any portion of the surface on the heavy plate that is out of true will cause the bearing to be inaccurately located.

Various types of frames have been advanced, but the need for machining has been a source of extra cost for years.

SUMMARY OF THE INVENTION

The present invention relates to an undercarriage for an excavator which supports a rotatable upper plate mounting a platform and a working implement, such as an excavator bucket, and provides a support for drive and propelling structure for the excavator. The undercarriage includes a frame having a support plate for supporting a swing bearing and ring gear used for mounting the upper plate and the excavator bucket, without machining subsequent to welding the frame together.

The frame is made up of two frame sections having flat top plates with integral depending skirts on the sides thereof. The plates and skirts will nest together, so that the plates that support the bearing are contiguous. The skirts of the plates are then welded together without any welding in the center plate portions of the frame sections. This minimizes any distortion of the plates, and leaves the center portions flat for mounting the bearing, including the ring gear.

To insure conformance of the top plates and to clamp the ring gear tightly, a reinforcing or backing ring is preferably placed on the bottom side of the top plates and the ring gear bearing bolts passed through the ring. The reinforcing ring, when needed, provides a flattening action on the bottom one of the frame plates and holds the lower plate planar.

Components for supporting the tracks and accessories such as a backfill blade can be mounted onto the frame without causing distortions in the plates. When the bearing and ring gear are bolted in place, the two plates, which have lower individual bending strength in the center portions than the present unitary thick plate, will permit slight shifting to conform to the bearing base without distorting the bearing so that the bearing will be held positively, and true without machining the upper surface of the frame.

The frame assembly or welding is made of two formed frame sections, each comprising a rolled steel plate and integrally die formed depending skirts. The frame sections can be formed quite precisely, and when welded together along the skirts, and the corners (but not on the flat plates forming the center) the frame sections will be securely held as an assembly without inducing unnecessary welding stresses and consequent distortions into the support area for the bearing and ring gear. The skirts of the frame sections also are welded to a bottom plate that forms a box section for rigidity. Cross tubes or sockets for holding the track supports are welded in the lower sides of the frame section skirts and also added rigidity.

The track supports of the present device are slidably mounted in cross tubes on the frame assembly. The track supports will telescope for changing the width or tread of the tracks. A hydraulic cylinder is mounted between the tubes on the frame and extends laterally so when operated it will move the tracks laterally in or out as desired.

DETAILED DESCRIPTION OF THE PREFERRED EMBODIMENTS

Figures 1, 2:
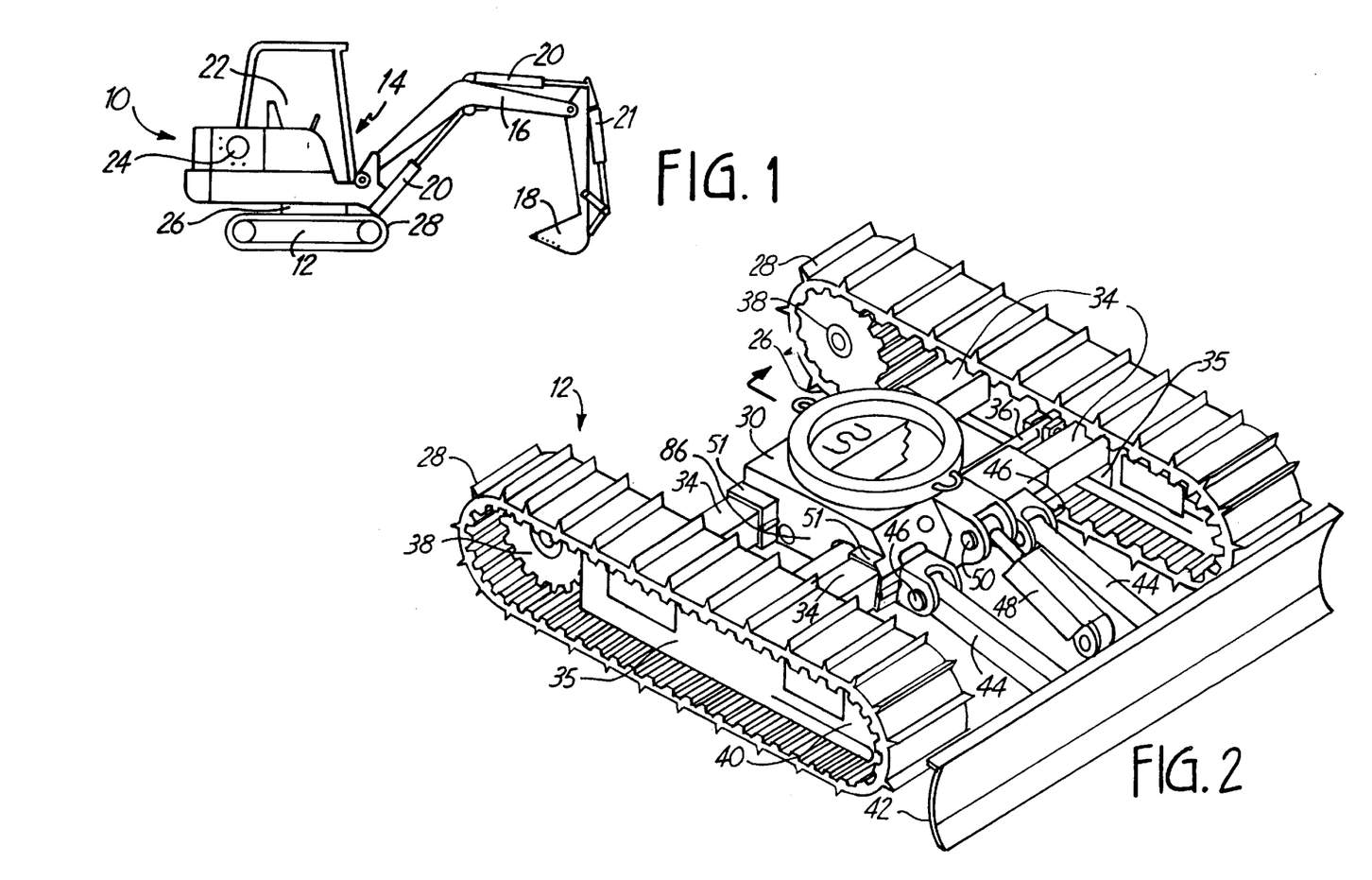
FIG. 1 is a schematic side view of a typical excavator utilizing the undercarriage or chassis of the present invention.
FIG. 2 is a fragmentary schematic perspective view of the undercarriage assembly, showing the tracks in place, and with a backfill blade supported on the undercarriage frame assembly.

A self-propelled power excavator or power shovel illustrated generally at 10 has an undercarriage 12 comprising a lower frame and drive assembly and an upper rotatable platform assembly 14 which supports a pivotally mounted two section boom 16 with a bucket 18 at the outer end thereof. The boom sections are operated with hydraulic actuators shown generally at 20 for moving the boom sections about horizontal pivots. The bucket 18 is also operated with a hydraulic cylinder 21. An operator's cab area 22 moves with the upper rotatable platform assembly 14, and includes a housing for an engine 24 to provide power. The platform assembly 14 is mounted to the undercarriage 12 through a swing bearing 26. The undercarriage 12 supports ground engaging tracks 28 that would be driven from a suitable drive arrangement such as hydraulic motors operated from a pump driven by the engine 24.

The excavator shown in FIG. 1 is a typical example of the type of excavator or power shovel that would utilize the undercarriage having a frame assembly made according to the present invention for supporting one race and a ring gear of the swing bearing 26.

Figure 5:
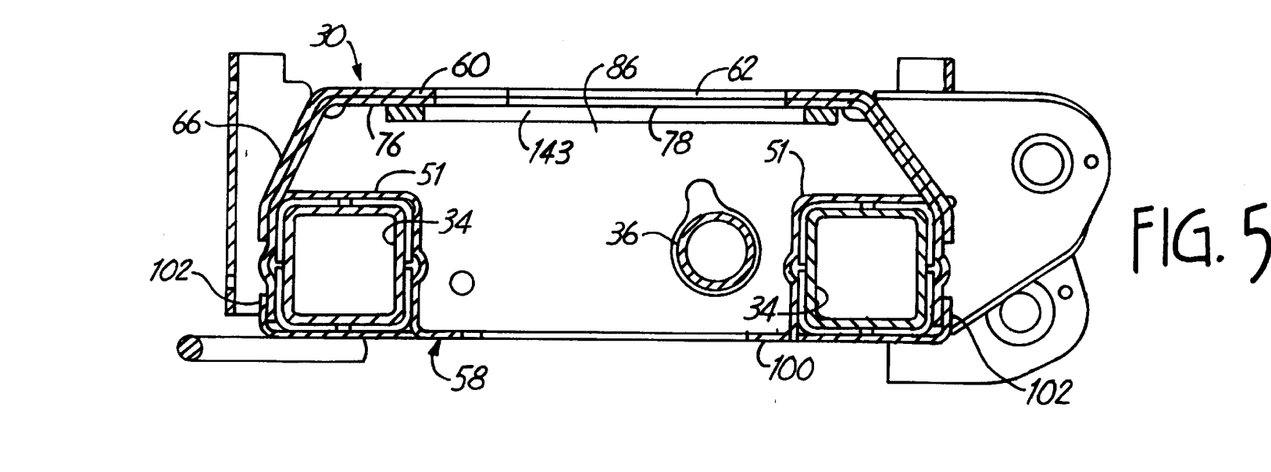
FIG. 5 is a sectional view taken as on line 5—5 in FIG. 4.
Figure 6:
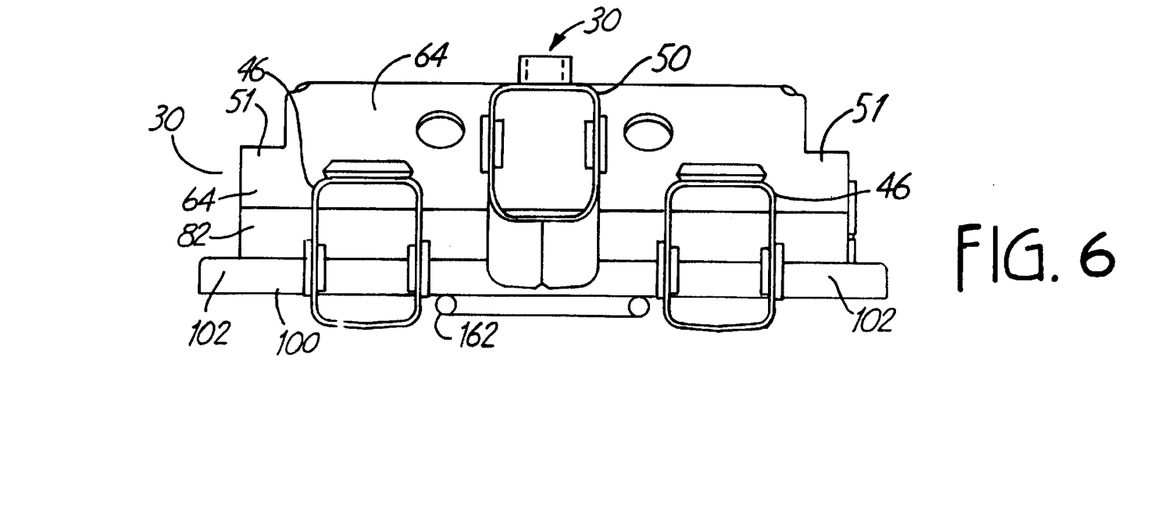
FIG. 6 is a front elevational view of the frame assembly of FIG. 4.

FIG. 2 is a schematic view of the undercarriage 12 with the platform assembly 14 removed. The tracks 28 are shown on opposite sides of the center frame assembly 30, which will be described in detail, which mounts the swing bearing 26 on the center frame assembly 30. The tracks 28 have conventional track support frames 35 which are attached to and supported on square tubes 34 that insert into tubes 51 of the center frame assembly. Tubes 34 are on both sides of the frame and can be telescoped laterally in and out through the use of a laterally extending hydraulic actuator 36 shown in FIG. 2 and in cross section in FIG. 5. The actuator 36 and the track support tubes 51 are shown only schematically, but the actuator 36 connects to the track frames 35 and extends through clearance openings in the side walls of the center frame 30. The actuator 36 has its base end connected to one frame 35 and the rod end is connected to the other frame 35 so that upon operating the actuator, 36 the tracks can be spread apart or moved together while telescoping tubes 34 slide in tubes 51.

The track support frames 35 are made in a conventional manner, and include sprockets shown at 38 mounted onto the frames 35 and driven to a suitable drive motor, such as a hydraulic motor. Suitable tensioning devices 40 for keeping the tracks under tension also can be provided on the track frames 35.

The undercarriage center frame assembly 30 can support a backfill blade 42, which is mounted onto support arms 44 that attach to brackets 46 that, as will be explained, are welded onto the center frame assembly 30 during assembly. The blade 42 can be raised and lowered relative to the pivots between the arms 44 and the brackets 46 through the use of a hydraulic actuator shown at 48 which has a base end attached to the blade 42, and a rod end attached to a bracket 50 that also is mounted on the center frame assembly 30.

In prior art excavators, the undercarriage center frame assembly 30 is made of parts including a very heavy top plate that is immediately underneath the bearing assembly 26, to support the bearing assembly. The conventional heavy top plate requires machining after components such as the brackets 46 and 50 and track support tubes 51 for the slide tubes 34 mounting the track assemblies are welded in place.

Figure 7:
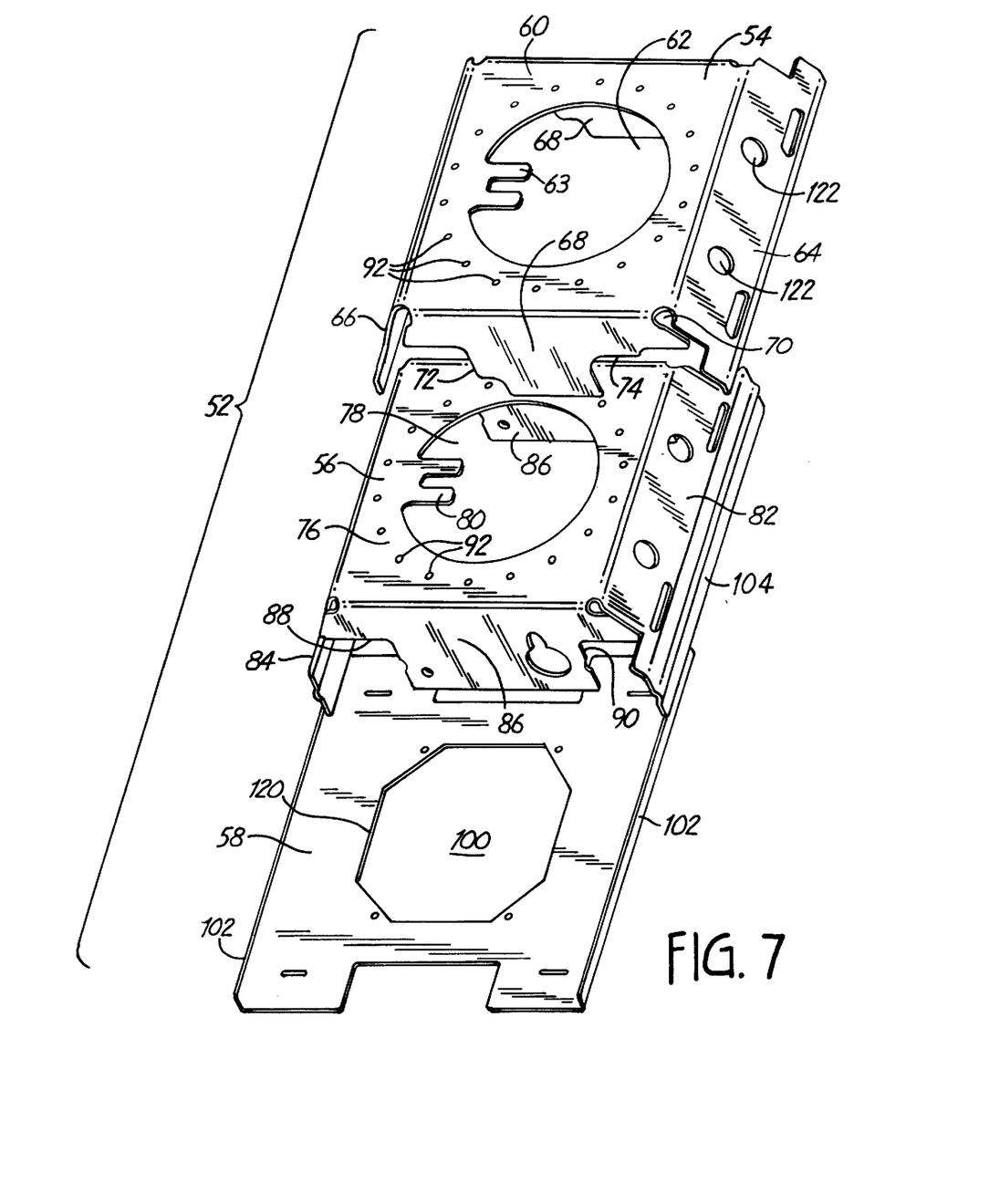
FIG. 7 is an exploded view of the frame sections or components of the frame assembly, including support plates for a swing bearing race.
Figure 8:
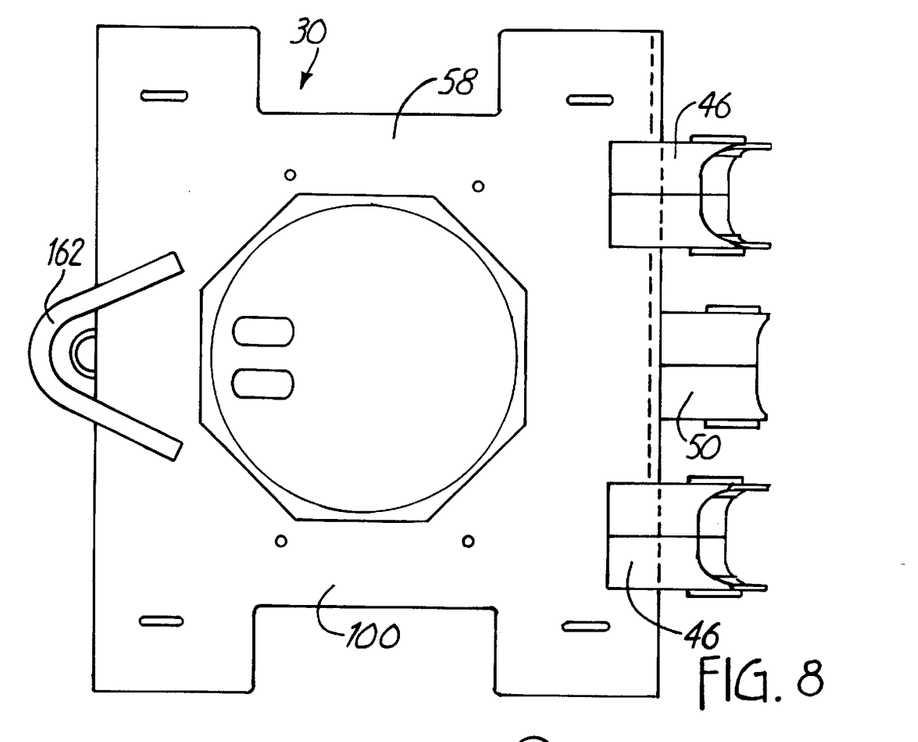
FIG. 8 is a bottom plan view of the undercarriage assembly of FIG. 3.

The center frame 30 of the present invention is constructed to avoid the need for machining support surfaces for the bearing assembly 26. As shown in FIGS. 3, 4, 5 and 6, the frame assembly 30 includes a base frame weldment 52 that is constructed in a manner such that it avoids the need for machining the upper surface. The frame weldment 52 is made of three basic parts, as shown in FIG. 7, including a formed top frame section 54, a lower frame section 56 which mates with the top frame section and which is welded thereto, and then a bottom cover plate 58, which is supported on and welded to the lower frame section 56.

First referring to the top frame section 54, it can be seen that it has a top plate 60 with an opening 62 in the center, and formed guides 63 that are used for holding or stopping desired parts. The plate 66 of frame section 54 has integrally formed downwardly sloping front and rear skirts or wall members 64 and 66 and side skirt members 68. At the corners of the top plate 60, there are recesses 70 cut out, when the edges of the skirt are formed. The lower edges 72 and 74 of the skirt 68 are formed in an irregular pattern for clearance and welding.

The lower frame section 56 has a plate 76 made to be contiguous with and below the top plate 60 of the top frame section 54. Plate 76 has a center opening 78 with guides 80 that match the opening 62 and the guides 64. The frame section 56 has a slightly smaller size than the top frame section 54, so that it will nest inside of the skirts or side walls 64, 66 and 68 and plates 60 and 76 engage or nest flat against each other. The lower plate 76 has a front skirt member 82 that is integrally die formed to depend from the plate 76. A rear skirt member 84 is integral with and also depends from the rear edge of the plate 76. The side edges of the lower plate 76 have integral depending skirts 86 thereon, which have peripheral edges 88 and 90 that are different in configuration and span a greater front to rear length than the edges 72 and 74 of skirts 68 the top frame section 54. The depending side skirts 68 and 86 on the upper sides of the frame section in FIG. 7 can be seen through the openings 62 and 78. Thus as shown skirts bound the periphery of the plates, but in some instances only two skirts will work.

The top and lower frame sections 54 and 56 will nest together, as stated, and it can be seen that the skirts of frame section 54 overlie and mate with the skirts of frame section 56. The skirts of frame section 54 are shorter than the skirts of frame section 56 when the plates 60 and 76 are contiguous or rest against each other with holes or openings 62 and 78 in registry. This leaves edges of skirts 64, 66 and 68 for welding to skirts 82, 84 and 86.

As can be seen a plurality of holes 92 are provided in both of the plates 60 and 76, and the holes 92 will also align when the frame sections are nested together. The top frame section 54 and the lower frame section 56 are nested together, and the top frame section skirts will be resting on or very closely adjacent the lower frame section skirts. They are welded together along the peripheral edges of the top skirt, including in the corners and recesses 70. There is no welding on the plates 60 and 76 in the preferred form.

Once the top frame section 54 and the lower frame section 56 are nested, the track supports and bottom cover plate 58 are assembled and welded in place. Bottom plate 58 has a planar center portion 100, and upstanding flanges 102 that will fit outside the lower edge portions 104 of the skirts 82 and 84, respectively. The parts are welded together so that the frame 30 has box section rigidity.

Before the bottom plate 58 is welded in place, the supports 51, that are inverted channels are placed in recesses 88 and 90 of the side skirt 86 of lower frame section 56, and are welded in place along the edges of the recesses so that they are held by the skirts of this lower frame section 56. When the bottom plate 58 is welded into place, the weldment forms tubular openings 110 and 112 (see FIG. 3) in which the track support assemblies can be mounted using the telescoping tubes 34.

Figure 3:
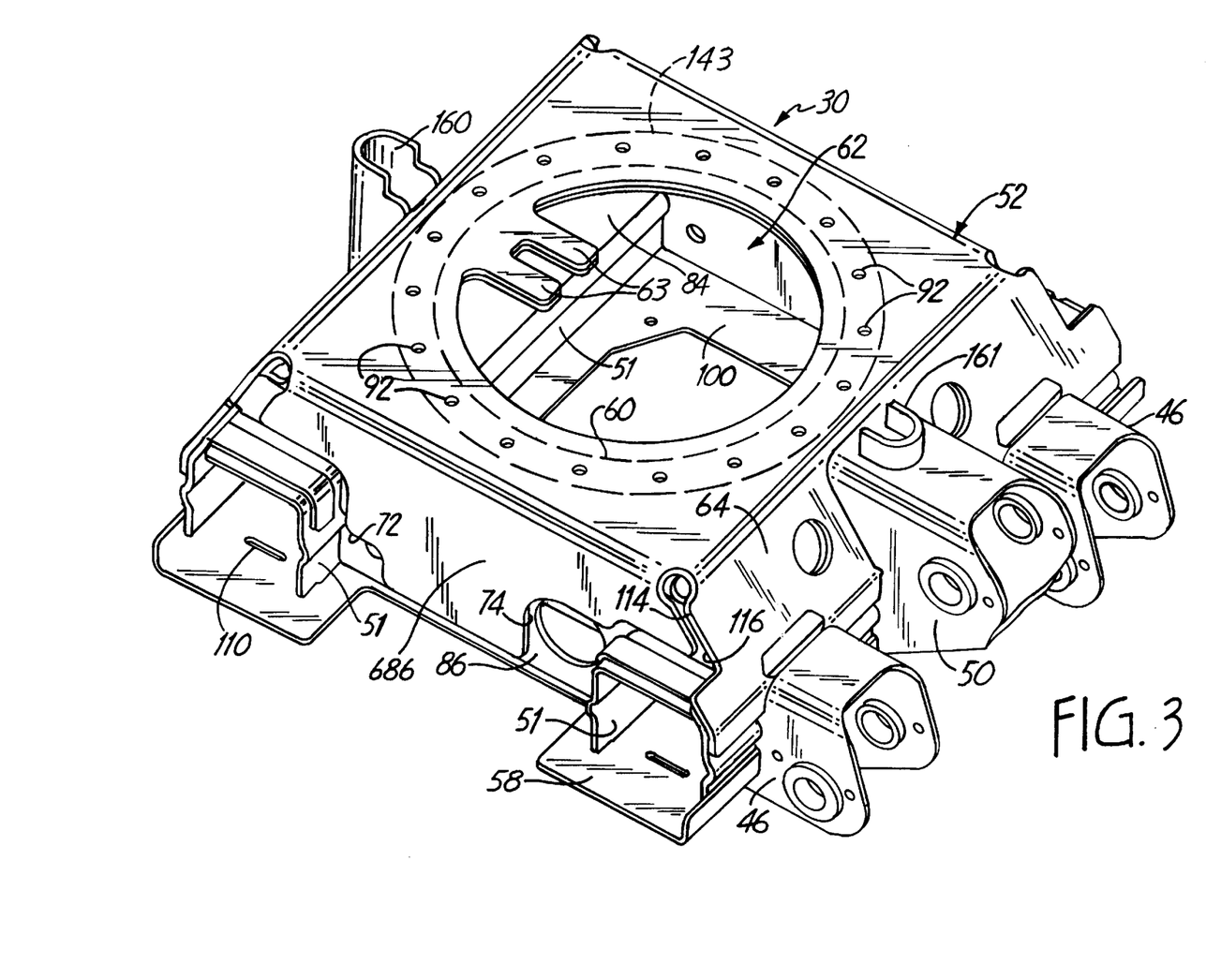
FIG. 3 is a perspective view of the undercarriage frame assembly shown in FIG. 2.
Figure 4:
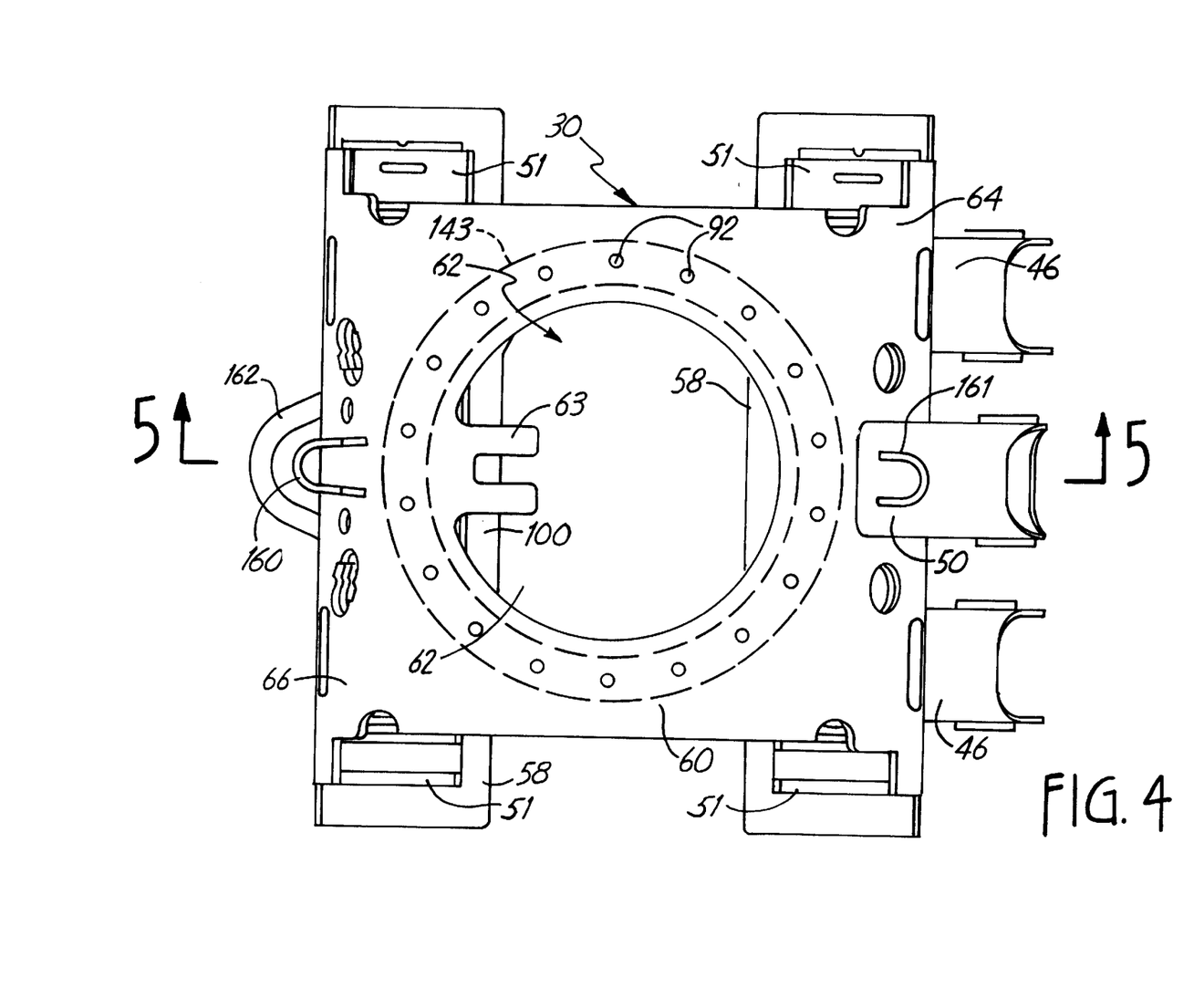
FIG. 4 is a top plan view of the frame assembly of FIG. 3.

When the top frame section 54 and the lower frame section 56 are welded together, the plates 60 and 76 are contiguous. They can be clamped together when welding takes place so that they touch along substantially their entire surfaces, and the holes 92 in each of the plates are aligning. This also then aligns the openings 78 and 62. This is shown in FIG. 3.

The skirts 86, as can be seen, have clearance openings for components, as well as for the channel shaped supports 51 and 53, and the edges 72 and 74 of the skirts 68 are recessed around clearance openings. Welding is along the edges 72 and 74 so that the skirts 68 and the skirts 86 are securely held together all along the periphery of the skirts 68. Welding continues between the skirts along all four corners as shown at 114 (FIG. 3), so that all edges of the skirts 68 are held in place. The welding at the front, continues down along the edges 116 to provide strength. There are weld lines along the lower edges of skirts 64 and 66 to weld to the front and rear skirt 82 and 84 of lower frame section 56, including along the side edges, so that the parts are securely welded together at the skirt portions, but the top plates 60 and 76 are not welded. The flanges 102 of bottom plate 58 are welded to the lower edge portions 104 of skirts 82 and 84.

The front skirts 64 and 82 have openings 122 that are used for mounting additional parts, and these are left unwelded, but if desired, openings can be provided so that welds can be made along the edges of openings. However, no welding is done in the center portions of the plates 60 and 76.

The conventional plates that are provided on the center frame are extremely heavy, and had to be machined to support a bearing ring. The heavy top plate did not have depending skirts, and was supported on a welded frame assembly. The support plate had a thickness of 1.58 cm, or in the range of ⅝ inch. The plates in the formed frame section of the present invention, comprising the upper and lower frame sections 54 and 56 are each usually in the range of 0.635 cm or ¼ inch.

Figure 9:
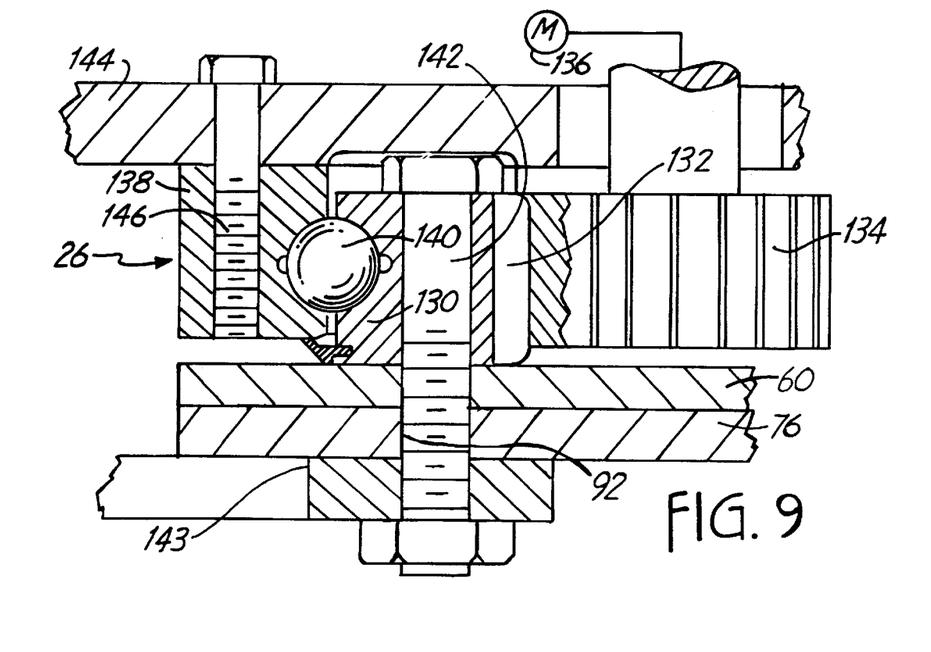
FIG. 9 is an enlarged sectional view of a bearing assembly as supported on the frame of the present invention and taken on line 9—9 in FIG. 2.

Referring to FIG. 9, an enlarged view through the bearing assembly is provided, and it can be seen that the upper plate 60 and the lower plate 76 have aligning bores 92 therein, around the openings 62 and 78. The bearing assembly 32 includes the inner bearing race or base ring 130 that is an annular ring and which has teeth 132 forming a ring gear thereon, against which a pinion gear 134 that is mounted for driving with a motor 136 will drive. The pinion 134 is mounted on the platform plate 144 of the upper platform assembly 14, so that as the pinion 134 is rotated, the upper platform assembly will rotate relative to the ring 130 through the outer race 138 forming part of the bearing assembly 26. As can be seen, the outer race is supported in place on the inner race or base ring 130 with a series of balls 140.

The vertical height of the inner race or base ring 130 may be in the range of 32 mm or about 1 ¼ inches. A heavy reinforcing ring 143 (for example in the range of ⅝" thick) is placed below lower plate 76, aligned with base ring 130. The reinforcing ring is annular and extends around the openings 62 and 78 and has bolt holes in a circle to match holes 92 as shown in FIG. 7. The ring 130 and reinforcing ring 193 are then clamped tightly against the upper surface of the upper plate 60 and the lower surface of lower plate 76 with bolts 142 that pass through the aligning openings 92 in plates 60 and 76 and can be tightened using a nut on the bottom of the reinforcing ring 143.

Since the plates 60 and 76 are relatively thin, compared to the heavy bearing ring and reinforcing ring, the plates can shift or flatten slightly if necessary to seat the bearing inner race or base ring 130 securely, as it is clamped, and provide good alignment for the two portions of the bearing. The tightening of the bolts 142 clamps plate 60 against the bearing ring and the reinforcing ring 143 clamps plate 76 against plate 60. The reinforcing ring 143 distributes compression forces across the bottom of plate 76 to make the plate 76 less likely to bulge between the bolts 142.

If the plates 60 and 76 are slightly wavy (rolled steel plate having a good finish is used for the frame sections 54 and 56) the waviness can be accommodated since the plates will conform because they can individually flex slightly as the bolts 142 are tightened down.

The outer race 148 of bearing 26 is fastened to platform plate 144 forming a part of the upper platform, using capscrews 146 that thread into bores in the bearing race 138 as shown.

The center frame is thus easily formed, and welded as an assembly, and can be used for mounting the bearing and ring gear assembly without machining. The welding is omitted from within the peripheral edges of plates 60 and 76 where the skirts join. The frame sections are die formed and the plates can be held flat with the heavy bearing ring and the reinforcing ring, while the integral skirts are also held to close tolerances so they nest precisely.

It should be noted that housing lock brackets 160 and 161 can be welded to the front and rear skirts and a catch bracket 162 can be welded to the bottom cover plate.

Although the present invention has been described with reference to preferred embodiments, workers skilled in the art will recognize that changes may be made in form and detail without departing from the spirit and scope of the invention.

What is claimed is:

1. A frame for mounting a swing bearing in an earth working machine comprising a lower frame having a substantially planar upper surface, said frame being formed of two frame sections nested together, each having an upper plate, each of the plates including skirts along at least selected edges thereof, wherein the upper plates are contiguous, and the frame sections being secured together by welding only along the nesting skirt portions.

2. The frame of claim 1, wherein said plates have peripheral edges, and welding is omitted within the peripheral edges.

3. The frame of claim 1, wherein a swing bearing having an annular race is mounted on the upper surface of the frame and wherein each plate has a plurality of aligning openings for securing the annular race of the swing bearing to the plates, said plates being unattached at locations within peripheral edges of the plates, said portions of the swing bearing being substantially thicker in an axial direction than thicknesses of the plates.

4. The apparatus of claim 1, wherein said frame sections include skirts on all sides of the plates, the skirts on an upper plate being relieved along edges to provide edges for welding to skirts on a lower plate.

5. The frame of claim 3 and a reinforcing ring in registry with the annuler race of the swing bearing below a lower surface of the frame, the reinforcing ring having openings aligning with the openings in each plate.

6. An undercarriage assembly for an excavator comprising a frame assembly having a pair of frame sections mated together, each of the frame sections including a plate, one on top of the other, to provide a total thickness for resisting and supporting loads in directions perpendicular to the plates, edge portions of said plates being welded together to form an assembly, a bottom cover plate welded to the edge portions of the frame sections, to form a box section, an inner one of said plates having a plurality of apertures for clamping a bearing race to an outer plate.

7. The undercarriage assembly of claim 6 including tubular members formed in said box section for supporting telescoping tubes, said telescoping tubes supporting drive components for the excavator.

8. The undercarriage assembly of claim 7 and hydraulic cylinder means connected to telescoping tubes on opposite sides of said frame to permit extending and retracting said tubular members for changing the tread of the supporting structure.

9. The undercarriage assembly of claim 7, wherein said supporting structure comprises a pair of tracks, one on each side of said frame, and wherein said telescoping tubes attach to track support frames.

10. The undercarriage assembly of claim 6, wherein said frame sections include skirts on selected sides of said plates, said skirts mating when the frame sections are nested together, and said skirts being welded together to form the frame.

11. The undercarriage assembly of claim 6, a bearing race on an upper surface of the top plate, and wherein said plates together provide a thickness that will support the bearing race, clamp fasteners for clamping the bearing race to the plates, the plates individually flexing to conform to the bearing race as the plates and the bearing race are clamped together.

12. The undercarriage assembly of claim 6 further comprising a reinforcing ring below the bottom plate, the clamp fasteners clamping the reinforcing ring against the bottom plate.

13. The undercarriage assembly of claim 12, wherein the frame sections are joined only around the periphery of the frame section.

14. A combination frame and bearing ring for use with a mobile machine on which a platform is rotatably mounted, comprising a frame, said frame having a plurality of frame sections stacked one on top of another, the frame sections each comprising a plate contiguous with adjacent frame sections, a plurality of openings aligning and in registry through the plates, a bearing ring supported on a top surface of one of said plates, and having openings in registry with the aligning openings in the plates, and threaded members passing through the opening in the bearing ring and the openings in the plates, and joining all of the plates together to clamp the plates and bearing ring tightly to one another to support said bearing ring, the threaded members being the sole joining members for the plates adjacent to the bearing ring.

15. The combination of claim 14 including a skirt on selected sides on each of said plates, said skirts nesting together when the plates are in contact, and said skirts being welded together to form the frame.

16. The combination of claim 14, wherein apertures in a bottom one of said plates, on a side of the plates opposite from the bearing assembly, is a threaded bore and the threaded member is a capscrew passing through the bearing ring and threaded into the threaded bore to clamp the plates and bearing ring together.

17. The combination of claim 15 and a bottom cover plate joined to the skirts of said frame sections to form a box type assembly.

18. The combination of claim 17 including cross tube members mounted in said frame, said cross tube members slidably receiving supports for ground engaging member on opposite sides of said frame, and a hydraulic actuator coupled to the supports for permitting adjustment of the lateral width of said ground engaging members relative to the frame.

19. A combination frame and bearing ring for use with a mobile machine on which a platform is rotatably mounted, comprising a frame, said frame having a plurality of frame sections stacked one on top of another, the frame sections each comprising a plate contiguous with adjacent frame sections, a plurality of openings aligning and in registry through the plates, a bearing ring supported on a top surface of a top of one of said plates and having openings in registry with the openings in the plates, and a reinforcing ring in registry with the bearing ring and on an opposite side of the plates from the bearing ring and having openings in registry with the openings in the plates and threaded members passing through the openings in the bearing ring, the aligning openings in the plates and the openings in the reinforcing ring and clamping all of the plates, the bearing ring and the reinforcing ring tightly to one another to support said bearing rings.

20. The combination of claim 19 wherein the openings in the reinforcing ring are threaded bores, and the threaded members are cap screws passing through the bearing ring, the plates and threaded into the reinforcing ring to clamp the bearing ring, plates and reinforcing ring together.

* * * * *